Feb. 4, 1958   J. L. LAMBERSON, JR., ET AL   2,822,051
BACK PRESSURE VALVE
Filed Sept. 1, 1954
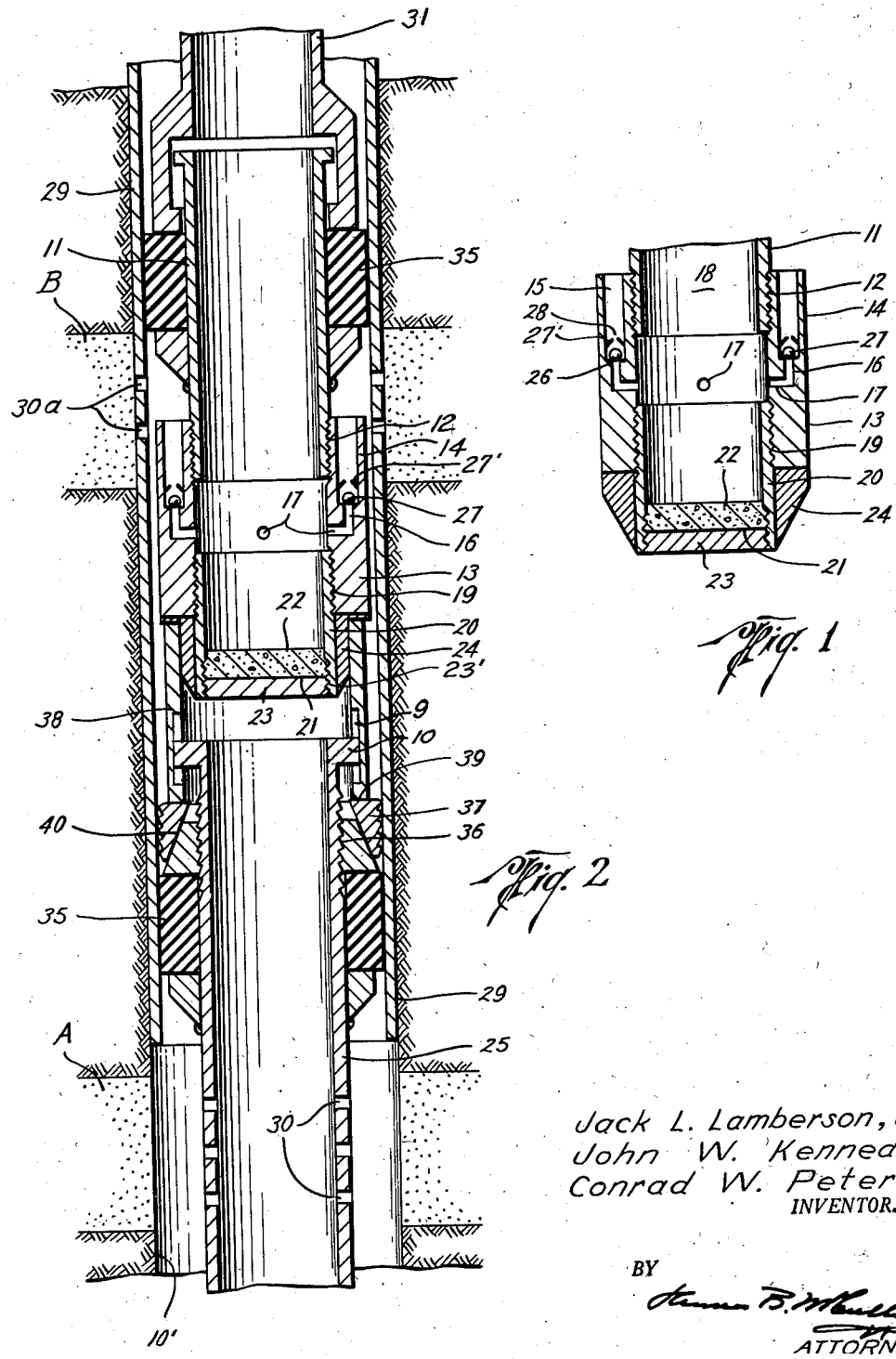
Jack L. Lamberson, Jr.
John W. Kenneday
Conrad W. Peter
INVENTORS
BY
ATTORNEY

United States Patent Office 2,822,051
Patented Feb. 4, 1958

2,822,051

BACK PRESSURE VALVE

Jack L. Lamberson, Jr., Conroe, John W. Kenneday, Houston, and Conrad W. Peter, Conroe, Tex., assignors, by mesne assignments, to Esso Research and Engineering Company, Elizabeth, N. J., a corporation of Delaware Application September 1, 1954, Serial No. 453,655

3 Claims. (Cl. 166—224)

The present invention is directed to a back pressure valve. More particularly, the invention is directed to a back pressure valve for use in well cementing operations. In its more specific aspects, the inventon is concerned with a back pressure valve providing a full open passageway through the back pressure valve.

The present invention may be described briefly as a back pressure valve adapted to be connected to a liner for use in well cementing operations. The back pressure valve comprises a valve body member which is provided with an annular sleeve having an annular space communicating fluidly with the exterior of the body member. At least one port communicates the annular space with the interior of the body member. Valve means are provided in the sleeve for fluid flow through the port from the interior of the body member to the exterior of the body member and to resist fluid flow from the exterior to the interior of the body member. A removable or drillable plug closes the lower end of the body member to provide when removed or drilled out a full open passageway. The valve means may comprise a ball and seat arranged in or on a vertical port communicating with the lateral port.

The drillable plug may be a cement plug or it may be a drillable metal plug or it may be a combination of cement backed up by a drillable metal.

It is contemplated that the lower end of the valve may be provided with a sealing means arranged to embrace or surround the lower end to form a seal with a perforated liner when the back pressure valve is connected to the blank liner such that another blank liner and the valve will seat down on a perforated liner and a full open bore liner is provided.

The invention will be further illustrated by reference to the drawing in which

Fig. 1 is a sectional view of the back pressure valve, and

Fig. 2 shows the arrangement of the blank liner with the back pressure valve landed on a perforated liner in a well casing.

For a clearer understanding of the nature of the invention, reference to the drawing in greater detail will be made, wherein Fig. 1 discloses the lower portion of a blank liner 11 connected to a valve body, generally indicated by numeral 13. The valve body 13 includes an annular upper sleeve 14, a lower sleeve 20, sealing material 24 and plugging material 22 and 23. Sleeve 14 is threadedly connected to liner 11 by mating threads 12 and to sleeve 20 by mating threads 19. Sleeve 20 is of lesser diameter than sleeve 14 and sleeve 20 extends below the lower end thereof, thereby forming between sleeves 14 and 20 a recess in which is located or positioned sealing means 24, which may be of deformable metal, such as lead, and is preferably of conical shape, as seen more clearly in Fig. 1. The upper sleeve 14 is formed to provide an annular chamber 15, which fluidly communicates with the interior of liner 11 via a plurality of passages 16 and 17. A ball 27 is positioned in each of the passages 16 within a cage formed in chamber 15 which include protuberances 27' extending from the walls of chamber 15. The sleeve 20 is closed by a plug, generally indicated by numeral 21 which consists of a cement plug 22 and a drillable metal plug 23 which latter is connected to sleeve 20 by mating threads 23'. The plug 22 may be used without the plug 23 or the plug 23 may be used without the plug 22; however, it is preferred to employ a cement plug backed up by a cast iron plug.

In Fig. 2 is shown a borehole penetrating producing zones A and B. The borehole is provided with a casing 29 which extends below zone B and is perforated as at 30a. Valve body 13 connected to liner 11 and engagedly connecting with a lower liner 25 is positioned in the borehole. Blank liner 11 is provided with a liner packer 35 and liner 25 is provided with a liner packer 35'. Packer 35 is employed to seal off the annulus between casing 29 and tubing 31 (which is connected to liner 11) above interval B. Packer 35' on liner 25 is adapted to seal off the annulus between the casing 29 and the liner 25 above the lower interval A adjacent which liner 25 has been perforated, as indicated at 30. Also, packer 35' is provided with pipe engaging means or slips 37 which are adapted to bite into or engage the wall of casing 29. The upper end 38 of liner 25 above packer 35' forms a sleeve which rests on shoulders 39 of pipe slips 37 and causes the slips 37 to move downwardly on the surfaces 40 of the slip assembly into engagement with casing 29. Liner 25 is provided with an annular shoulder 10 which engages slot 9 formed in slip 38. (As shown in Fig. 2, sleeve 38 rests on slips 37 thereby effectively sealing off the valve body 13 and liner 25 by means of the sealing material 24 engaging with the upper end of the sleeve 38.) Prior to inserting valve body 13 in the casing the slips are not set and shoulder 10 of liner 25 rides in the lower portion of slot 9. Valve body 13 is lowered on liner 11 into the casing 29 until the sealing means 24 of valve body 13 engages with the upper end of sleeve 38 and forces sleeve 38 downwardly, thereby causing shoulder 10 to move upwardly in slot 9. As the slips 37 set, the lower end of sleeve 38 will slide on shoulders 39 of slips 37 as the slips move outwardly to engage the casing 29.

In operation, as shown in Fig. 2, perforated liner 25 is positioned in open hole 10' below the casing 29. Blank liner 11 with valve body 13 connected thereto is then run in the casing 29 on the end of a pipe string 31 and is set down on the upper end of the sleeve 38, such that a seal is formed between the valve body 13 and the sleeve 38 with the sealing means 24. The packer 35 closes off the annulus between liner 11 and casing 29 above interval B. The packer 35' closes off the annulus between liner 25 and casing 29 above zone A and below zone B. The valve body 13 is positioned adjacent zone B. Cement is then pumped down through the pipe 31, through passageways 17 and 16, through the valve means, including the ball 27 and protuberances 27', into annular chamber 15 and thence into the annulus between casing 29 and liner 11 adjacent perforations 30a. Thus, perforations 30a may be cemented off. After the perforations 30a have been cemented off, plug 21 may be drilled out thereby allowing a full bore liner for production from zone A through perforations 30 in liner 25. This invention, therefore, provides a full open type back pressure valve for use in cementing blank liners opposite casing perforations that have been made to obtain reservoir information in sands above an open hole completion zone producing through a conventional liner seating.

In the practice of the present invention, it is contemplated that other types of valve means besides that illustrated may be used, such as a flapper or rubber sleeve type check valve but these valves must be arranged such that the full opening bore will not be obstructed in any manner whatsoever.

The nature and objects of the present invention having been completely described and illustrated, what we wish to claim as new and useful and to secure by Letters Patent is:

1. A back pressure valve adapted to be connected to a first liner and to engage with a second liner comprising a first sleeve connected to said first liner, a second sleeve of lesser outside diameter than said first sleeve and connected to said first sleeve, said first and second sleeves cooperating to form a recess, said first sleeve being formed to provide means adapted to fluidly communicate the interior and exterior of said first sleeve, valve means arranged in said fluid communication means adapted to permit fluid flow from the interior to the exterior of said first sleeve and to prevent fluid flow from the exterior to the interior of said first sleeve, sealing means arranged in said recess adapted to engage with said second liner and a plug positioned in said second sleeve adapted to prevent fluid flow therethrough.

2. A device as recited in claim 1 wherein said plug is drillable and includes a layer of cement and a layer of metal.

3. A device as recited in claim 1 wherein said sealing means comprises deformable metal.

References Cited in the file of this patent

UNITED STATES PATENTS

| | | |
|---|---|---|
| 1,822,193 | Barton | Sept. 8, 1931 |
| 1,839,709 | Smith | Jan. 5, 1932 |
| 2,117,535 | Baker et al. | May 17, 1938 |
| 2,374,169 | Boynton | Apr. 24, 1945 |